United States Patent
Rhoads et al.

(10) Patent No.: US 6,332,031 B1
(45) Date of Patent: Dec. 18, 2001

(54) MULTIPLE WATERMARKING TECHNIQUES FOR DOCUMENTS AND OTHER DATA

(75) Inventors: Geoffrey Rhoads, West Linn; Ammon Gustafson, Beaverton, both of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/616,462

(22) Filed: Jul. 14, 2000

Related U.S. Application Data

(63) Continuation of application No. 09/234,780, filed on Jan. 20, 1999, now abandoned.
(60) Provisional application No. 60/071,983, filed on Jan. 20, 1998.

(51) Int. Cl.[7] .................................................. G06K 9/00
(52) U.S. Cl. ......................... 382/100; 380/28; 380/232
(58) Field of Search .................................... 382/100, 232, 382/162, 112, 218, 219; 355/40; 375/150; 702/191; 705/1; 713/176

(56) References Cited

U.S. PATENT DOCUMENTS

| | | | |
|---|---|---|---|
| 5,493,677 | 2/1996 | Balogh | 395/600 |
| 5,521,722 | 5/1996 | Colvill | 358/510 |
| 5,530,759 | 6/1996 | Braudaway | 380/54 |
| 5,598,526 | 1/1997 | Daniel et al. | 345/507 |
| 5,617,119 | 4/1997 | Briggs | 707/100 |
| 5,636,292 | 6/1997 | Rhoads | 382/232 |
| 5,664,018 | 9/1997 | Leighton | 380/54 |
| 5,673,316 | 9/1997 | Auerbach | 705/51 |
| 5,687,236 | 11/1997 | Moskowitz | 380/28 |
| 5,751,854 | 5/1998 | Saitoh | 382/218 |
| 5,819,289 | 10/1998 | Sanford | 707/104.1 |
| 5,825,892 | 10/1998 | Braudaway | 380/51 |
| 5,862,218 | 1/1999 | Steinberg | 713/176 |
| 5,862,260 | 1/2001 | Rhoads | 382/232 |
| 5,875,249 | 2/1999 | Mintzer | 380/54 |
| 5,893,101 | 4/1999 | Balogh | 707/100 |
| 5,898,779 | 4/1999 | Squilla | 713/176 |
| 5,933,798 | 8/1999 | Linnartz | 702/191 |
| 5,949,055 | 9/1999 | Fleet | 235/469 |
| 5,974,548 | 10/1999 | Adams | 713/200 |
| 5,991,426 | 11/1999 | Cox et al. | 382/100 |
| 6,064,764 | 5/2000 | Blaskaran | 382/183 |

FOREIGN PATENT DOCUMENTS

WO 00/44131   7/2000  (WO) .

OTHER PUBLICATIONS

"Safeguarding Digital Library Contents and Users" By Fred Mintzer, Jeffery Lotspiech, Norishige Morimoto D–Lib Magazine, Dec. 1997.

"Audio Watermarking Architectures for Secure Digital Music Distribution" Mar. 26, 1999 A proposal to the SDMI Portable Devices Group.

SDMI Secure Digital Music Initiative portable Device Working Group Mar. 5, 1999 by Chris Cookson Warner Music.

(List continued on next page.)

*Primary Examiner*—Jayanti K. Patel
(74) *Attorney, Agent, or Firm*—Elmer Galbi

(57) ABSTRACT

Multiple digital watermarks, each of which has different characteristics, are embedded in a document. The characteristics of the various watermarks are chosen so that each of the watermarks will be affected in a different manner if the document is subsequently copied and reproduced.

The detection process or mechanism reads each of the watermark and compares their characteristics. While wear and handling may change the characteristics of the digital watermarks in a document, the relationship between the characteristic of multiple digital watermarks in a document will never-the-less give an indication as to whether a document is an original or a copy of an original.

6 Claims, 4 Drawing Sheets

OTHER PUBLICATIONS

US Application SN 09/404,291 filed Sep. 23, 1999 Inventor Kenneth Levy.

US application 60/114,725 filed Dec. 31, 1998 Inventor: Kenneth Levy.

US application SN 60/116,641 Priority application for PCT/US00/01150.

US Application 09/478,713 filed Jan. 6, 2000 priority application for PCT/US00/01150.

XP 000668961 Raymond B. Wolfgang and Edward J. Delp "A Watermark for Digital Images" 09/96, pp. 219–222 IEEE 0–7803–32 58–X.

XP–000965031 Maxwell Sandford, Jonathan NBradley and Theordore Handel, Los Alamos national Laboratory, "The data Embedding Method" Proceeding of the SPIE 1996: pp. 226–259.

*"Safeguarding Digital Library Contents and Users: Digital Watermarking"* By: Fred Mintzed, Jeffrey Lotspiech and Norishige Morimoto D–Lib Magazine, Dec. 1997 ISSN 1082–9873.

Boland et al. (watermarking Dgital Images for Copyright Protection) Image Processing And it Applications 44–6 Jul. 1995, IEE, pp. 326–3340.

Vidal et al. ("notiecable Information Embedding in Color Images: Marking and Detection") IEEE 1999, pp. 293–297.

FIG. 3A GEOMETRICALLY LINEAR ASSIGNMENT OF PIXELS TO EACH BIT
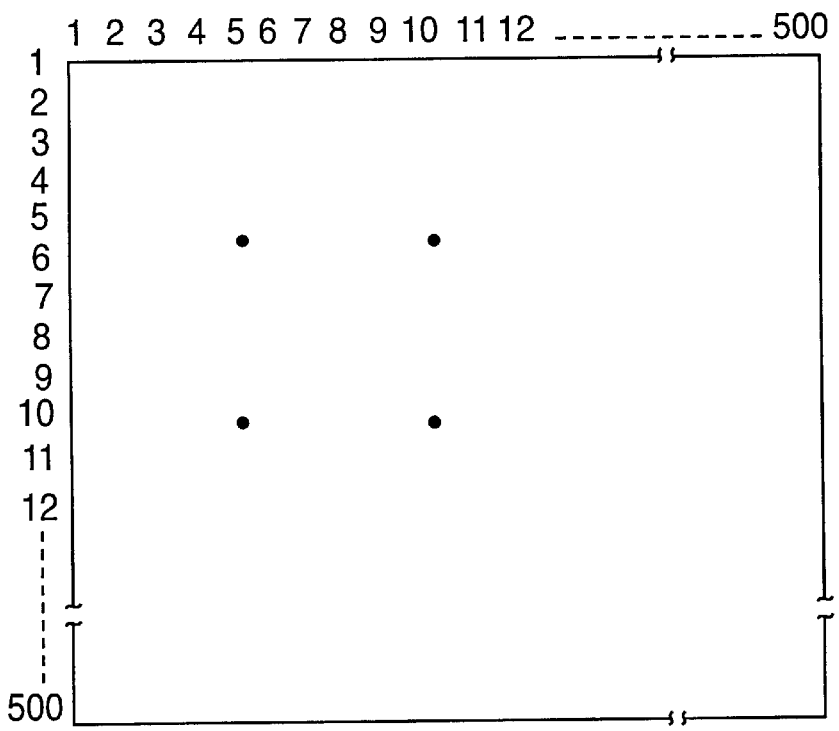
FIG. 3B GEOMETRICALLY RANDOM ASSIGNMENT OF PIXELS TO EACH BIT
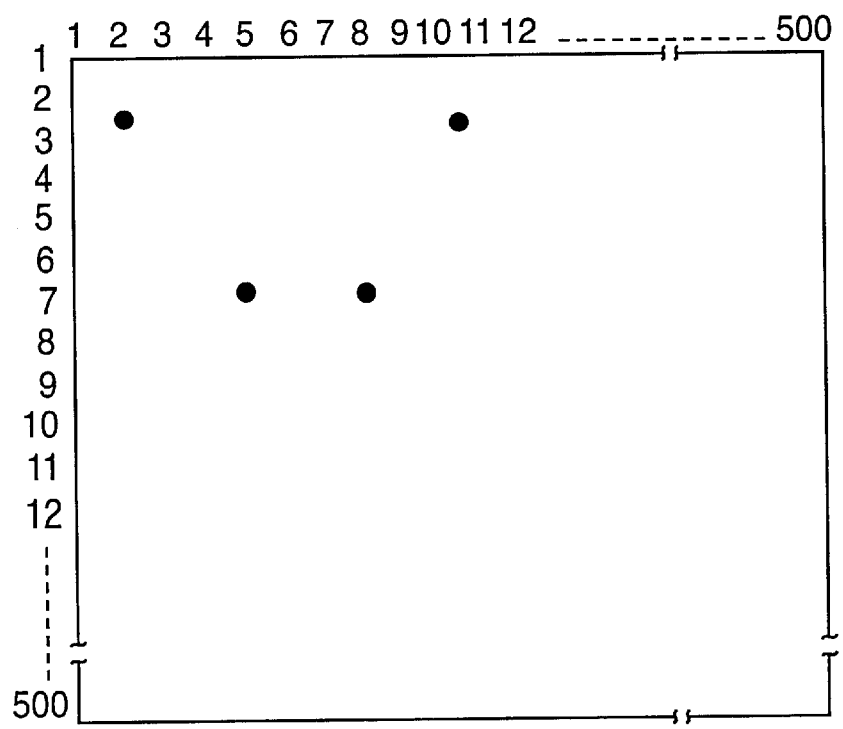

(1) RGB ⟶ HSI (2) First Watermark $$HSI + WM1\Delta \xrightarrow{T} RGB1$$

(3) Second Watermark $$HSI + \text{Biased } WM2\Delta \longrightarrow RGB2$$

(4) Final image    (RGB1 + RGB2) / 2 = RGBF

FIG. 4

MULTIPLE WATERMARKING TECHNIQUES FOR DOCUMENTS AND OTHER DATA

RELATED APPLICATIONS

The present application is a continuation in part of application Ser. No. 09/234,780 filed Jan. 20, 1999 now abandoned is now and which is a continuation of application Ser. No. 60/071,983 filed Jan. 20, 1998. Both applications Ser. Nos. 60/071,983 and 09/234,780 are assigned to the assignee of the present application.

FIELD OF THE INVENTION

The present invention relates to steganography and more particularly to the use of watermarks to determine the authenticity and history of a particular document or image.

BACKGROUND OF THE INVENTION

Steganographic and digital watermarking technologies are well know. For example see U.S. Pat. No. 5,636,292 and the extensive references cited therein. Also see copending patent applications Ser. No. 08/327,426 which was filed Oct. 21, 1994 and copending application Ser. No. 08/436,134 which was filed May 8, 1995.

The technology for inserting digital watermarks in images and the technology for reading or detecting digital watermarks in images is well developed, well known and described in detail in public literature. Furthermore, there are commercially available products which include programs or mechanisms for inserting digital watermarks into images. For example the commercially available and widely used products "Adobe Photoshop" which is marketed by Adobe Corporation of San Jose California and "Corel Draw" program which is marked by Corel Corporation of Ontario Canada, include a facility for inserting digital watermarks into images.

The technology for making high quality copies of documents is widely available. The technical quality of scanners and color printers has been increasing rapidly. Today for a relatively low cost one can purchase a high quality scanner and a high quality color printer. Thus, it is becoming increasingly easy to duplicate documents. The ability to create high quality copies has created a need for technology which can differentiate between original documents and copies of the original.

It is known that watermarks can be used to help differentiate genuine documents from copies. However, the prior art techniques for using digital watermarks to differentiate genuine documents from copies have serious limitations. The present invention is directed to an improved technique for using steganography and digital watermark technology to facilitate differentiating original documents from copies of the original.

The present invention can also be used for various other purposes such as to embed multiple types of information in a single document or to provide watermarks which enable documents to perform special functions.

SUMMARY OF THE INVENTION

With the present invention multiple digital watermarks, each of which has different characteristics are embedded in a document. The characteristics of the two watermarks are chosen so that each of the watermarks will be affected in a different manner by what may subsequently happen to the document.

The detection process or mechanism reads the two digital watermarks and compares their characteristics. While wear and handling may change the characteristics of the individual watermarks, the relationship between the characteristic of the two watermarks will never-the-less give an indication as to whether a document is an original or a copy of an original.

For example according to the present invention two digital watermarks in a document may have different energy levels. The absolute energy level of a digital watermark in an original image may be decreased if a document is subject to wear. Likewise the energy level of the digital watermark in an image may be decreased if an image is scanned and reprinted on a color printer. However, the relationship between the energy level of the two digital watermarks will be different in an image that has been subject to wear and in a reproduced image. Likewise if two digital watermarks are introduced into an image where the bit pattern used to construct the digital watermarks have different patterns, the ratio between the signal to noise ratio of the watermarks will be different in an original subject to wear and in a copy generated by scanning the original and printing the scanned image. Other characteristics of multiple digital watermarks can also be used to differentiate original documents from copies.

BRIEF DESCRIPTION OF THE FIGURES

FIGS. 3A and 3B show a geometrically linear and a geometrically random assignment of pixels to a bit in a digital watermark.

FIG. 4 illustrates a fourth embodiment of the invention.

DETAILED DESCRIPTION OF PREFERRED EMBODIMENTS

Figure 1:
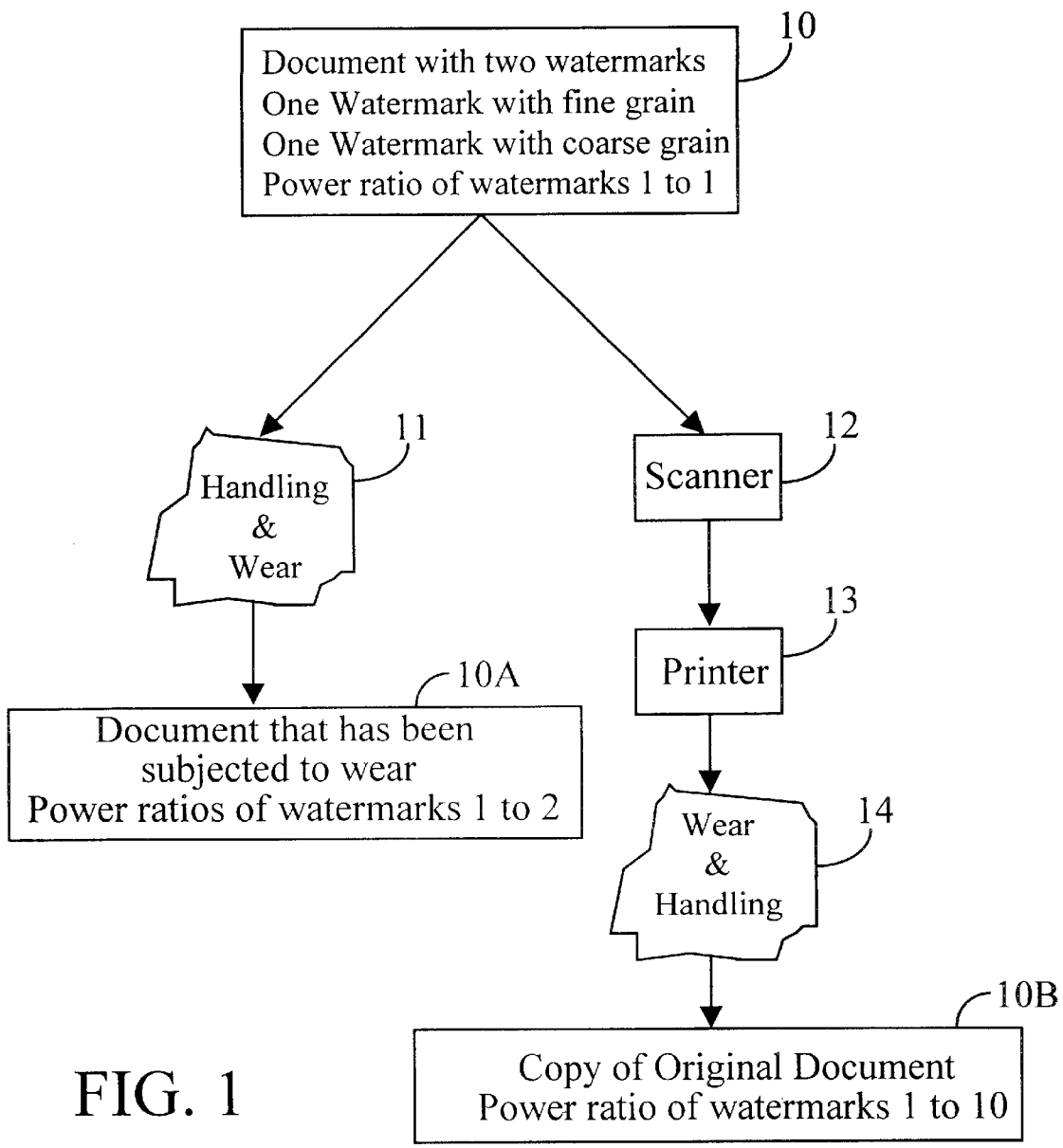
FIG. 1 shows the paths that a document and a copy may follow.

The problem of differentiating an original document from a copy is made more difficult in situations where the original document is subject to being handled, worn, folded and otherwise damaged. Many original documents such as identification documents and currency are extensively handled. The wear to which such documents are subjected reduces the quality of images on the document and therefore reduces the quality of any information embedded in the document using conventional steganographic techniques.

With the present invention a number of different watermarks are embedded in a document. Each of the watermarks embedded in the document, has different characteristics. All watermarks are somewhat affected when a document is subjected to wear, and all watermarks are somewhat affected when a document is duplicated by being scanned and reprinted. However, the magnitude of the effect caused by being scanned and reprinted on watermarks with certain characteristics is much greater than the effect on watermarks with different characteristics. Likewise, wear and handling of a document affects watermarks with certain characteristics much more than it affects watermarks with different characteristics.

Thus, if multiple watermarks with different characteristics are inserted into a document, it is possible to differentiate a copy from an original document that has been subjected to wear by examining the ratios of characteristics of the watermarks in the image being examined.

In order to print a document on a color printer, the document is put through a transformation from a color space such as the RGB color space to a different color space such as the CMYK (cyan, magenta, yellow, black) color space. Such transformations are well know. For example see chapter 3 entitled "Color Spaces" in a book entitled "Video Demystified, A handbook for the Digital Engineer", Second Edition, by Keith Jack, published by Harris Semiconductor and Hightext Publications of San Diego, Calif.

When an image is transformed from one color space to another color space, noise is introduced into the image. Among the reasons for this is the fact that each color space has its own distinctive gamut (or range) of colors. Where the gamut of two color spaces overlap, the conversion from one color space to another color space can in theory be precise. However, there will be some areas which are in the gamut of one color space not in the gamut of another color space. Such situations definitely introduce noise into the conversion process. Even in areas that are in the gamut of two color spaces, conversion from one color space to another color space introduces noise because of such things as round off errors. The present invention takes advantage of the fact that if an original is copied and then a copy is printed, the image on the printed copy will have gone through several conversions to which the original will not have been subjected.

For example, the conversions to which a copy may be subjected are:
1) a document to RGB conversion (i.e. scanning the document into the computer),
2) a RGB to CMYK conversion,
3) a CMYK to copy conversion (i.e. printing the document).

Any characteristics of the two digital watermarks that will be affected differently by the additional conversion process to which copies are subjected can be used to differentiate copies from an original. Since the two watermarks with different characteristics are affected in a different manner by the additional conversion step, a comparison of the characteristics of the two watermarks in a document being examined will indicate if the document is an original (which has not gone through the additional conversions) or a copy which has gone through the additional conversions. While the characteristics of each watermark will have been changed by wear and by the copying process, the comparison between the characteristics of the two watermarks will still be able to differential a copy from an original.

Four embodiments of the invention are described below. Each of the embodiments utilizes two watermarks in a document. The differences between the two watermarks in the document are as follows:

In the first embodiment:
First watermark: Has fine grain
Second watermark: Has a course grain In the second embodiment:
First watermark: Has geometrically linear assignment of pixels
Second watermark: Has geometrically random assignment of pixels.

In the third embodiment:
First watermark: Has low power
Second watermark: Has higher power In the fourth embodiment:
Fist watermark: uses standard RGB to HSI and HSI to RGB transformations
Second watermark is biased before being transformed from HSI to RGB.

FIG. 1 shows the steps to which documents and copies are typically subjected. In the normal course, a document 10 may be subjected to handling and wear 11 resulting in a worn document 10A. Document 10 may also be scanned as illustrated by box 12. The scanning produces a digital image which can be printed as illustrated by box 13. The printed image may be subjected to handling and wear 14 resulting in a copy 10B. It is noted that the document 10 may also be subject to handling and wear prior to the scanning operation 12. The task to which this invention is directed is the task of differentiating the worn document 10A from the copy 10B.

Figure 2A:
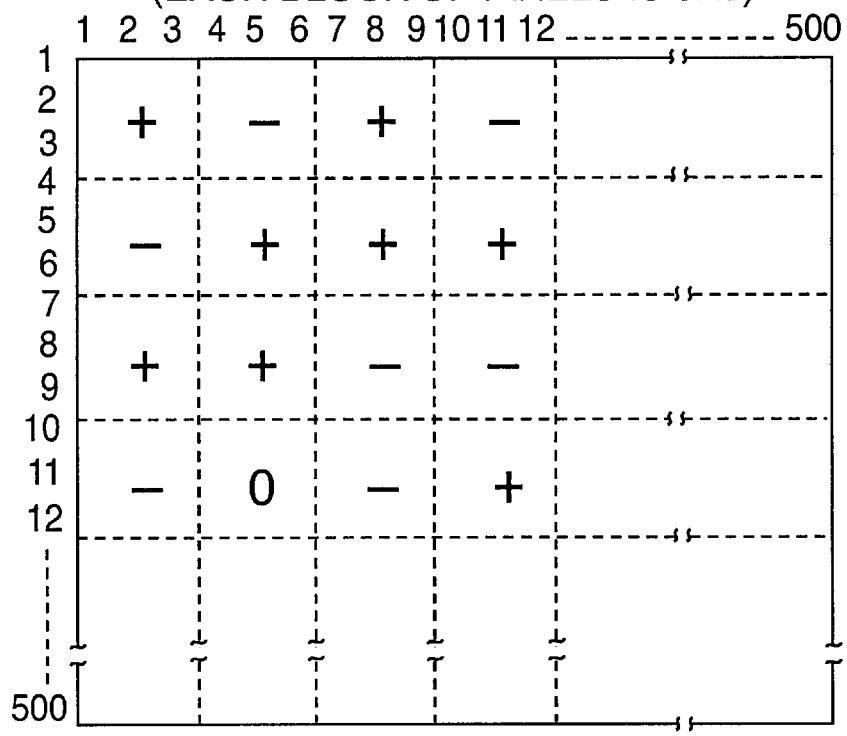
FIGS. 2A and 2B show a fine grain and a course grain watermark.
Figure 2B:
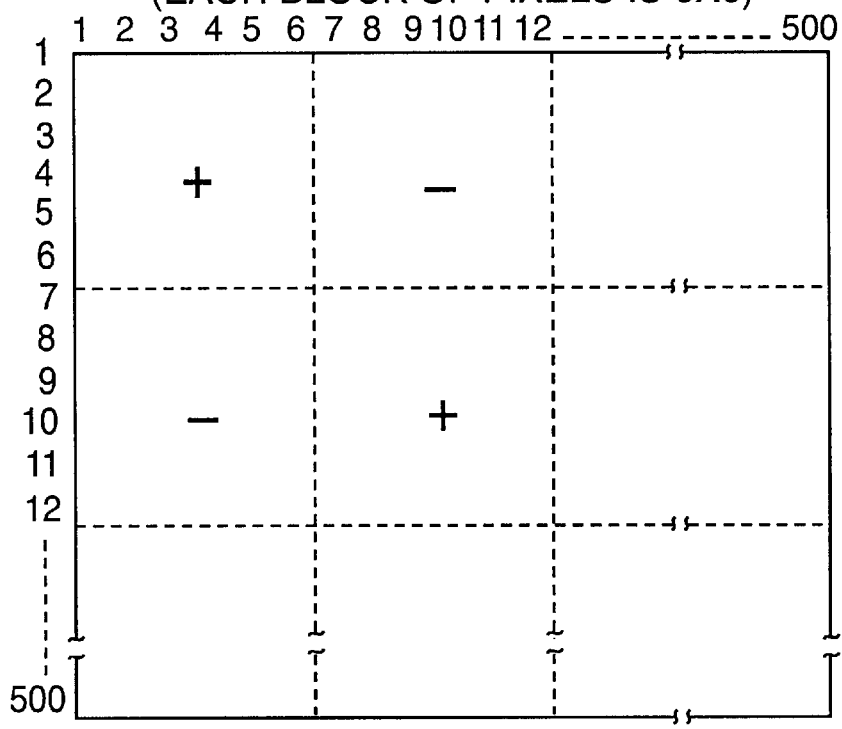

The document 10 includes an image (not explicitly shown) which has two digital watermarks inserted therein. In the first embodiment of the invention, the first watermark has a fine grain and the second watermark has a course grain. The grain of the two watermarks is illustrated in FIG. 2. FIG. 2A shows the grain of the first watermark and FIG. 2B shows the grain of the second watermark. The first watermark uses blocks of 9 pixels (a 3 by 3 block). Each of the pixels in each 9 pixel block has its gray value changed by the same amount. For example FIG. 2A shows that the first 9 pixel block has its gray value increase and the second 9 pixel block has its gray value decreased. The amount of increase and the selection of blocks that is increased and decreased is conventional.

As shown in FIG. 2B, the grain of the second watermark is in blocks that are 6 pixels by 6 pixels or 36 pixels. All of the pixels in each 36 pixel block are changed by the same amount.

In the original document 10, the two watermarks have a power ratios of 1 to 1. After wear and handling, the power of the first watermark will be degraded somewhat more than the power of the second watermark. For example, as illustrated in FIG. 1, after document 10 is subjected to handling and wear, a detector which reads the watermarks might find that the power ratio of the water marks is 1 to 2.

If the document 10 is scanned and the resulting digital image is printed to make a copy of the document 10, the ratio of the power of the watermarks will be affected much more than the effect of handling and wear. For example as illustrated in FIG. 1, the power ratio of the watermarks may be 1 to 10, thereby allowing one to differentiate the worn original document 10A from the copy 10B.

It is noted that the mechanism for inserting watermarks into an image is well known as is the technique for reading a watermark and using correlation techniques to determine the signal to noise ratio (i.e. the power) of a watermark.

FIGS. 3A and 3B shown an alternative technique for implementing the present invention. In the second embodiment of the invention, the two watermarks inserted into the image on a document have different patterns of assigning pixels to the bits of the number which the watermark represents. The first watermark utilizes a geometrically linear assignment of pixels to each bit. For example FIG. 3A shows an image that has 500 by 500 pixels. Considering a watermark with 50 bits, each bit of the watermark would have 5000 pixels assigned to represent that bit. A linear assignment could have each fifth bit in each row (100 bits per row) and each fifth row (50 rows) assigned to each bit of the watermark. Thus 5000 pixels would be assigned to each bit in a very orderly or linear manner.

In the second watermark the pixels would be assigned to each bit in a random manner as shown in FIG. 3B. Each bit in the watermark would still have 5000 assigned bits; however, the pixels would be a random location over the image. Naturally it should be understood that FIGS. 3A and 3B illustrate how pixels are assigned to one bit of the watermark. The other bits of the watermarks would have pixels assigned in a similar manner.

Similar to the first embodiment of the invention, the watermark with a linear assignment of pixels and the watermark with a random assignment of pixels would be affected differently by handling and wear on the original document than they would be by being scanned and reprinted.

The third embodiment of the invention described herein utilizes watermarks which have different power levels. Handling and wear as contrasted to scanning and printing would affect a watermark with a low power level differently than a water mark with a high power level. Watermarks with different power levels can be inserted into a document in order to practice the present invention utilizing commercially available programs such as Adobe Photoshop or Corel Draw. In the Adobe Photoshop and Corel Draw programs, the power or intensity of the watermark can be adjusted by setting a simple control setting in the program.

The fourth embodiment of the invention introduces different characteristics into two watermarks by modifications made to one of the watermarks during the initial step during which the watermarks are introduced into an image. The operation of the fourth embodiment can be explained as shown in FIG. 4. First as illustrated by equation 1 there is a conversion from RGB to HSI as is conventional. This is illustrated by equation 1. As illustrated by equation 2, the first watermark is inserted into the image in a conventional manner by modifying the I value in the HSI representation of the image using the first watermark values (designated as WM1 Δ). A first RGB value designated RGB(1) is then calculated using a conventional transformation designated T. As indicated by equation 3, the second watermark WM2 is then biased toward a particular color and the biased watermark is then combined with the HSI values and transformed to a second set of RGB values designated RGB(2). Finally as indicated by equation 4, the values RGB(1) and RGB(2) are combined to form the watermarked image designated RGB(F).

The transform used to go from RGB to HSI color space (indicated in equation 1 in FIG. 4) can be anyone of a variety of known other techniques. For example, the RGB to HSI conversion can be one of the techniques explained in the above referenced text book such as the following: (which assumes that RGB and Intensity have a value range of 0 to I and that Red equals 0°):

First calculate:
$M = \max(R,G,B)$
$m = \min(R,G,B)$
$r = (M-R)/(M-m)$
$g = (M-G)/(M-n)$
$b = (M-B)/(M-m)$
Then calculate I, S, and H as follows:
a) $I = (M+M)/2$
b) if $M=m$ then $S=0$ and $H=180$
   if $I<or=0.5$ then $S=(M-m)/(M+m)$
   if $I>0.5$ then $S=(M-m)/(2-M-m)$
c) if $R=M$ then $H=60(b-g)$
   if $G=M$ then $H=60(2+r-b)$
   if $B=M$ then $H=60(4+g-r)$
   if $H>or=360$ then $H=H-360$
   if $H<0$ then $H=H+360$ The first watermark in inserted into the RGB values in a conventional manner by modifying the I value of appropriate pixels so as to combine the watermark Δ values with HSI values. This is indicated by equation 2 in FIG. 4. Next as indicated by equation 3 in FIG. 4, the HSI values are converted to RGB values using a transform "T". The transform "T" can be conventional and it can for example be done as follows:

First calculate:
if $I<or=0.5$ then $M=I(I+S)$
if $I>0.5$ then $M=I+S-IS$
$m=2I-M$
if $S=0$ then $R=G=B=I$ and $H=180°$
Then calculate R, G and B as follows:
a) if $H<60$ then $R=M$
   if $H<120$ then $R=m+((M-m)/((120-H)/60))$
   if $H<240$ then $R=m$
   if $H<300$ then $R=m+((M-m)/((H-240/60))$
   otherwise $R=M$
b) if $H<60$ then $G=m+((M-m)/(H/60))$
   if $H<180$ then $G=M$
   if $H<240$ then $G=m+((M-m)/((240-H\_/60))$
   otherwise $G=m$
c) if $H<120$ then $B=m$
   if $H<180$ then $B=m+((M-m)/((H-120/60))$
   if $H<300$ then $B=M$
   otherwise $B=m+((M-m)/((360-H)/60))$ Next the values which represent a second watermark are used to calculate a second set of RGB values designated RGB2. In order to calculate RGB2, the values of H and S are modified so that they are slightly biased toward a particular color designated H1 and S1 New values for H and S are calculated as follows:
(Note, H1 must be between 0 and 360, S1 must be non-negative and can be between 0 and 1 and X is a value between 0 and 1)
Calculate new values for H and S as follows:
If $H>H1$ then $H=H-(H-H1)x$
   else $H=H+(H1-H)x$
If $S>S1$ then $S=S-(S-S1)x$
   else $S=S+(S1-S)x$ Next add the second watermark to the values of HSI and transform these values to the RGB color space as indicated by equation 3 The transformation from HSI color space to RGB color space is done as previously indicated.

Finally as indicated by equation 4 in FIG. 4, the final RGB value (designated RGBF) is calculated by combining the values of RGB1 and RGB2. This combination can be done in a variety of known ways.

It is noted that in the above example the difference between the transformation used for the first and the second watermarks involves biasing the values of H and S.

Alternatively a wide variety of different changes could also be made. The key to this fourth embodiment of the invention is that in effect a different transformation is used for the first and the second watermarks.

While four embodiments of the invention have been shown herein it should be understood that many other characteristics and attributes of a digital watermark could be used to practice the present invention in addition to the characteristics and attributes described herein. Furthermore other known digital watermarking techniques can be used together with and applied to the digital watermarks used for the present invention. It is also noted that while in the above examples only two watermarks were used, in some situations one could use three, four five or more watermarks. That is, the embodiments of the invention specifically described herein utilize two watermarks. It should be understood that any number of watermarks could be utilized in like manner. Furthermore while the embodiments shown herein utilize two separate watermarks, the two watermarks used to practice the present invention could be combined into one watermark which has a plurality of separate identifiable and measurable characteristics.

It is noted that while the present invention utilizes multiple watermarks with different characteristics to differentiate original documents from copies of the original, one can also utilizes multiple watermarks with different characteristics for other reasons. Documents may include multiple similar watermarks in addition to the watermarks which have different characteristics according to the present invention. As used herein, in general, the term "document" refers to a physical entity.

While the present invention has been described with respect to four specific embodiments of the invention, it should be understood that various changes in form and detail could be made without departing from the spirit and scope of the invention. The scope of the present invention is limited only by the appended claims.

We claim:

1. A method of creating a watermarked image which comprises the steps of:

modifying an HSI (hue, saturation, Intensity) representation of an image to imbed a first watermark in said image and create a first watermarked image, transforming said first watermarked image to the RGB (red, green, blue) color space, biasing the values which represent a second watermark toward a particular color, modifying said HSI values to imbed said biased second watermark in said image and create a second watermarked image, transforming said second watermarked image to the RGB color space, and combining the values of said first and second watermarked images to create a final watermarked image.

2. The method recited in claim 1 wherein said biasing is toward a particular color.

3. A method of differentiating copies of an original document from the original document, said document containing a first digital watermark which has a first set of characteristics and a second digital watermark which has a second set of characteristics, said method comprising the steps of:

reading said first and second watermarks from said original document and comparing the resultant values to generate a first set of results, reading said first and second watermarks from said copy of said original document and comparing the resulting values to generate a second set of results, and using differences between said first and second sets of results to differentiate an original document from a copy of said original document.

4. The method recited in claim 3 wherein said first digital watermark has a first energy level and said second watermark has a second energy level.

5. The method recited in claim 3 wherein said first watermark has a first bit pattern and said second watermark has a different bit pattern.

6. The method recited in claim 3 where both said original document and said copy have been subjected to wear.

* * * * *